(12) United States Patent
Chou et al.

(10) Patent No.: US 10,760,405 B2
(45) Date of Patent: Sep. 1, 2020

(54) APPARATUS AND METHOD FOR SEMI-THREE-DIMENSIONAL ROCK FORMATION IMAGING ALONG THE BOREHOLE SIDEWALL

(71) Applicant: SINOTECH ENGINEERING CONSULTANTS, INC., Taipei (TW)

(72) Inventors: Po-Yi Chou, Taipei (TW); Hung-Chieh Lo, Taipei (TW); Po-Jui Chen, Taipei (TW); Chien-Chung Ke, Taipei (TW)

(73) Assignee: SINOTECH ENGINEERING CONSULTANTS, INC., Taipei (TW)

( * ) Notice: Subject to any disclaimer, the term of this patent is extended or adjusted under 35 U.S.C. 154(b) by 272 days.

(21) Appl. No.: 16/022,148

(22) Filed: Jun. 28, 2018

(65) Prior Publication Data

US 2019/0010799 A1    Jan. 10, 2019

(30) Foreign Application Priority Data

Jul. 4, 2017  (TW) .............................. 106122452 A

(51) Int. Cl.
| | | |
|---|---|---|
| *E21B 47/002* | (2012.01) | |
| *G06T 11/00* | (2006.01) | |
| *E21B 49/00* | (2006.01) | |
| *E21B 47/14* | (2006.01) | |
| *G06T 7/00* | (2017.01) | |

(Continued)

(52) U.S. Cl.
CPC ............ *E21B 47/002* (2020.05); *E21B 47/14* (2013.01); *E21B 47/26* (2020.05); *E21B 49/00* (2013.01); *E21B 49/005* (2013.01); *G06T 7/0004* (2013.01); *G06T 7/40* (2013.01); *G06T 11/003* (2013.01); *G06T 2207/10028* (2013.01); *G06T 2207/10132* (2013.01); *G06T 2207/30181* (2013.01)

(58) Field of Classification Search
USPC ....... 382/109, 154; 367/7, 25, 28, 35; 702/6, 702/9, 11
See application file for complete search history.

(56) References Cited

U.S. PATENT DOCUMENTS 4,780,862 A * 10/1988 Clerke .................... G01V 1/52
181/402
4,855,965 A * 8/1989 Rambow ................. G01V 1/46
367/69

(Continued)

*Primary Examiner* — Ishrat I Sherali
(74) *Attorney, Agent, or Firm* — Muncy, Geissler, Olds & Lowe, P.C.

(57) ABSTRACT

Disclosed is an apparatus and method for imaging semi-three-dimensional rock formation along the borehole sidewall, and a database, a calculation module, and a pattern generation module are included and can be configured in an electronic device. The database continuously fetches the acoustic reflection amplitude data from a high resolution acoustic televiewer (HiRAT), which moves vertically along the borehole. The calculation module performs a mathematical and statistical process on the acoustic reflection amplitude data for the pattern generation module to generate the image of semi-three-dimensional structure of rock formation along the borehole sidewall. Thus, the semi-3D rock formation image provided by the present invention is beneficial for the researcher to easily identify the characteristics of rock formation.

10 Claims, 2 Drawing Sheets

(51) Int. Cl.
*G06T 7/40* (2017.01)
*E21B 47/26* (2012.01)

(56) References Cited

U.S. PATENT DOCUMENTS

| | | | | |
|---|---|---|---|---|
| 5,502,686 A * | 3/1996 | Dory | ............ | G01V 11/00 |
| | | | | 367/34 |
| 5,616,840 A * | 4/1997 | Tang | ............ | G01V 1/48 |
| | | | | 73/152.05 |
| 5,638,337 A * | 6/1997 | Priest | ............ | G01V 11/005 |
| | | | | 367/27 |
| 5,987,385 A * | 11/1999 | Varsamis | ............ | E21B 47/0224 |
| | | | | 702/6 |
| 5,995,447 A * | 11/1999 | Mandal | ............ | G01V 1/44 |
| | | | | 181/106 |
| 7,184,991 B1 * | 2/2007 | Wentland | ............ | G01V 11/00 |
| | | | | 706/45 |
| 7,463,552 B1 * | 12/2008 | Padgett | ............ | G01V 1/288 |
| | | | | 367/38 |
| 7,492,664 B2 * | 2/2009 | Tang | ............ | G01V 1/28 |
| | | | | 367/31 |
| 7,826,973 B2 * | 11/2010 | Washbourne | ............ | G01V 1/28 |
| | | | | 702/6 |
| 9,840,898 B2 * | 12/2017 | Kasevich | ............ | E21B 33/124 |
| 2002/0103630 A1 * | 8/2002 | Aldred | ............ | E21B 44/00 |
| | | | | 703/10 |
| 2010/0265795 A1 * | 10/2010 | Johnson | ............ | G01V 1/44 |
| | | | | 367/32 |
| 2011/0255370 A1 * | 10/2011 | Hirabayashi | ............ | G01V 1/42 |
| | | | | 367/31 |
| 2018/0031718 A1 * | 2/2018 | Freitas | ............ | G01V 1/22 |

* cited by examiner

APPARATUS AND METHOD FOR SEMI-THREE-DIMENSIONAL ROCK FORMATION IMAGING ALONG THE BOREHOLE SIDEWALL

CROSS-REFERENCE TO RELATED APPLICATION

This application claims the priority of Taiwanese patent application No. 106122452, filed on Jul. 4, 2017, which is incorporated herewith by reference.

BACKGROUND OF THE INVENTION

1. Field of the Invention

The present invention generally relates to an apparatus and method for imaging the rock formation, and more specifically to an apparatus and method for imaging three-dimensional rock formation along the borehole sidewall by continuously processing the reflection amplitude data and generating a semi-3D rock formation imagery through a simple calculation, thereby improving the accuracy for determining the relative strength of rock strata, the homogeneity of rock types, the distribution of weak planes, and greatly beneficial for the researcher to more easily identify the features of rock formation along the borehole sidewall.

2. The Prior Arts

In the conventional geotechnical engineering practices, the characteristics of rock structures are observed and recorded by cross comparison of driller's-logs and different core logs during and after the field work. Then, the properties of rock mass discontinuities along the borehole are statistically determined. However, the working progress is laborious and time-consuming. Sometimes, the rock core is disintegrated after taken from a great depth, where the core recovery is poor due to much of the clay material is washed away during drilling and therefore unable to perform visual inspection.

Moreover, a high resolution acoustic televiewer (HiRAT) in the prior arts substantially used to solve the above problem. After a borehole is drilled to a desired depth, the HiRAT is deployed in the borehole then operated while trolling. This logging instrument generates a digital, magnetically oriented image of the borehole wall; thereby the researcher can examine the formation structure along the borehole sidewall, identify the location of fractures, and analyze the homogeneity of rock masses.

In addition, the basic operating principle of HiRAT is that as it employs an ultrasonic wave as the transmitting signal, which is emitted from the HiRAT and reflected at the water-wall interface, and the strength of the reflected signal from the borehole wall is interpreted to determine the characteristics of rock formation. The HiRAT is usually provided with a fixed ultrasonic transducer assembly, and one 360° rotatable reflecting mirror to scan the borehole wall. In general, the transmitter is configured to transmit an ultrasonic wave with high-frequency (0.5-1.5 MHz) during investigation. The transmitted ultrasonic wave propagates via groundwater or any drilling fluids as a medium and reflected by the borehole wall back to the transducer.

Specifically, two traditional scan schemes for images production are widely used.

One scan scheme is that the amplitude of the reflected signal is first converted into 8-bit color (256 colors), and a two-dimensional image composed of the 256 levels data is displayed to illustrate the detailed structure of rock formation. When the borehole is smooth without discontinuities or significant lithological changes, the amplitude of reflected signal is going to be higher and so the brightness of the corresponding color is going to be higher too. On the contrary, in case the borehole is irregular in radius due to the occurrence of any kind of discontinuities, the strength of reflected signal is reduced, the amplitude is going to be lower and so the brightness of the corresponding color level is becoming darker. Thus, the researcher can examine the variation of brightness of the image to identify the depth and location of any discontinuities. However, one shortcoming in the prior arts is that the two-dimensional image maybe helpful in identifying the occurrence of any kind of discontinuities, but unable to provide sufficient information to interpret the topology of rock formation.

The second scan scheme is that a borehole breakout image log is depicted by the use of the post-processing program called WellCAD based on the travel time of the reflected ultrasonic wave. Such scheme helps researcher to understand how the borehole is deformed due to the tectonic stress, and to estimate the direction of the principal stress. However, the use of such borehole breakout log can only provide limited information regarding the composition of rock formation, the variation in geological structure, and unable to identify the location of the permeable layers of rock formation.

Therefore, it is greatly needed to provide a new apparatus and method for imaging rock formation by continuously processing the reflection amplitude data and generating a semi-3D rock formation imagery through a simple calculation, thereby improving the accuracy for determining the relative strength of rock strata, the homogeneity of rock types, the distribution of weak planes, thereby overcoming the above problems in the prior arts.

SUMMARY OF THE INVENTION

The primary object of the present invention is to provide an apparatus for imaging three-dimensional rock formation along the borehole sidewall to assist researcher quickly identify the characteristics of rock formation. The apparatus comprises a database, a calculation module, and a pattern generation module, which can be configured in an electronic device.

The database is connected to a high resolution acoustic televiewer (HiRAT) for receiving and storing a plurality of acoustic reflection amplitude data as a raw data bank, and the HiRAT is configured to move vertically along the borehole and generate the acoustic reflection amplitude data with respect to the depth in the borehole. Specifically, an acoustic wave is emitted from the HiRAT and reflected at the water-wall interface to generate the reflection amplitude signal.

The calculation module is electrically linked to the database for automatically fetching the acoustic reflection amplitude data by executing a specific program, and at the same time, performing a mathematical and statistical process on the acoustic reflection amplitude data within a depth interval to obtain a statistic value for the acoustic reflection amplitude signal. Then, the calculation result is generated and substantially comprises of the statistic values for showing the distribution tendency of the acoustic reflection amplitude data.

The pattern generation module is electrically linked to the calculation module for fetching the results of the calculation module, and particularly, performing a pattern generation and output process based on the distribution profile of the acoustic reflection amplitude data. A semi-three-dimensional image of rock formation along the borehole sidewall can be generated by employing a spreadsheet program.

Another object of the present invention is to provide a method for generating a semi-three-dimensional image of rock formation along the borehole sidewall, substantially comprising the steps of: continuously fetching a plurality of acoustic reflection amplitude data from a high resolution acoustic televiewer (HiRAT), the HiRAT moves vertically along the borehole and generate a plurality of acoustic reflection amplitude data with respect to the depth in the borehole as a raw data bank, an acoustic wave is emitted from the HiRAT and reflected at the water-wall interface; performing a mathematical and statistical process on the acoustic reflection amplitude data within a depth interval to obtain a statistic value for the acoustic reflection amplitude signal for showing the central distribution tendency of the acoustic reflection amplitude data; and constructing a distribution profile of the acoustic reflection amplitude data by employing a spreadsheet program to generate a semi-three-dimensional image of rock formation of along a borehole.

Further, the mathematical and statistical process may comprise calculating an arithmetic average or studying the central distribution tendency of the acoustic reflection amplitude data. The measure of central distribution tendency may comprise looking at how data points tend to group around a median or a central value of the acoustic reflection amplitude data or a probability distribution for showing the central location or the common trend for data distribution.

Therefore, the present invention relates to a process for the analyze of the continuous reflection amplitude data and the generation of the semi-3D rock formation image through a simple calculation so as to improve the accuracy for determining the relative strength of rock strata, the homogeneity of rock types, the distribution of weak planes, and then to identify significant lithological changes as well as the location of the permeable layers of rock formation, thereby assisting the researcher to identify the characteristics of rock formation along the borehole sidewall.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
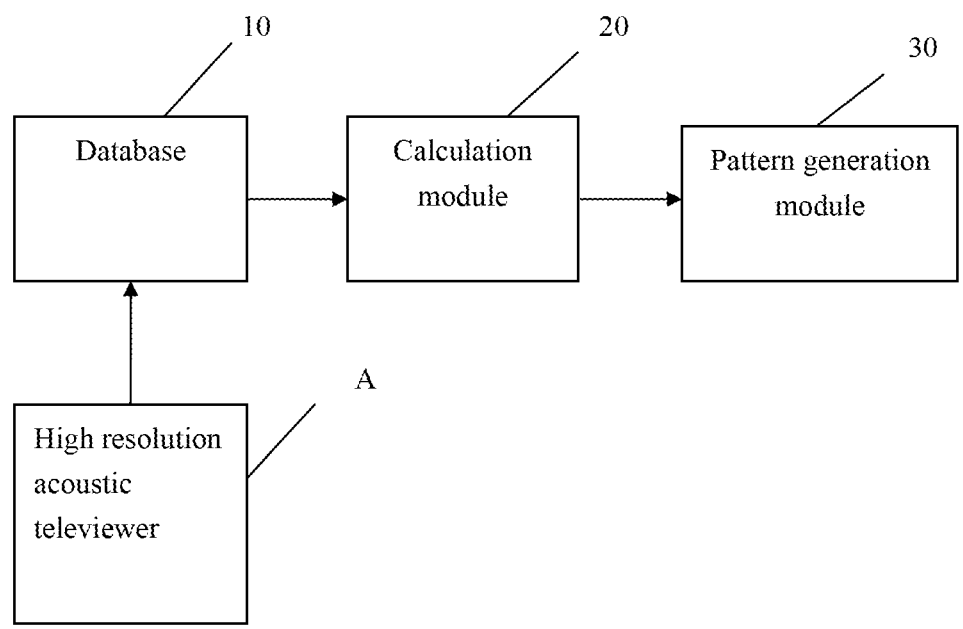
FIG. 1 is a view showing the apparatus for producing a semi-three-dimensional rock formation image along the borehole sidewall, and the method of producing an image according to the first embodiment of the present invention.

Please refer to FIG. 1 illustrating the apparatus for generating three-dimensional rock formation image along the borehole sidewall according to the first embodiment of the present invention. As shown in FIG. 1, the apparatus for generating a semi-three-dimensional rock formation image generally comprises a database 10, a calculation module 20, and a pattern generation module 30, which can be configured in an electronic device, for assisting the researcher to identify the characteristics of rock formation along the borehole sidewall. The above electronic device can be, but not limited to, an iPod, an iPod Touch, an iPhone, an Android device, a Mac, a PC, a tablet, an iPad, a smart device, a smart appliance, a notebook, a computer, a communications device, a mobile phone w/text, a smartphone, a personal digital assistant (PDA), a mobile phone, an Internet browser application, a standalone application, a set top box, a television receiver, a smart television, and/or any of various exemplary but not limiting devices, etc.

Specifically, the database 10 is connected to a high resolution acoustic televiewer (HiRAT) A for receiving and storing a plurality of acoustic reflection amplitude data as a raw data bank, and the HiRAT A is configured to move vertically along the borehole (not shown) and continuously generate acoustic reflection amplitude data with respect to the depth in a borehole. In addition, an acoustic wave is emitted from the HiRAT A and reflected at the water-wall interface (not shown) to generate the reflection amplitude signal. Particularly, the HiRAT A continuously generates and records the acoustic reflection amplitude data by rotating 360° around the borehole sidewall.

It should be noted that the HiRAT in the prior arts is connected to a computer, and the acoustic reflection amplitude data generated by the HiRAT is fetched by the computer and further processed and converted into a color image with 256 levels through a post processing program, instead of employing the database to directly fetch the data from the HiRAT A. Therefore, the present invention is considered to provide a much simpler process and easier operating procedure.

The calculation module 20 is electrically linked to the database 10 for automatically fetching the acoustic reflection amplitude data by executing a specific program. At the same time, the calculation module 20 performs a mathematical and statistical process on the acoustic reflection amplitude data within a depth interval to obtain a statistic value for the acoustic reflection amplitude signal. Then, a calculation result is generated and substantially comprises the statistic value for showing the distribution tendency of acoustic reflection amplitude data.

The above mentioned mathematical and statistical process may comprise calculating an arithmetic average, but it is not intended to limit the scope of the present invention. In other words, any mathematical means to show the central distribution tendency of the acoustic reflection amplitude data is substantially included in the present invention.

The so-called central distribution trend comprises a median or a central value of the acoustic reflection amplitude data or a probability distribution for showing the central location or the common trend for data distribution.

Furthermore, the pattern generation module 30 is electrically linked to the calculation module 20 for automatically fetching the calculation result of the calculation module 20 through a specific program. In particular, the pattern generation module 30 performs a pattern generation and output process based on the acoustic reflection amplitude data within a depth interval to construct a distribution profile of the acoustic reflection amplitude data by employing a spreadsheet on the acoustic reflection amplitude data to generate a semi-three-dimensional image of showing the structure of rock formation along the borehole sidewall.

It is obviously addressed that the depth interval is, but not limited to, 0.001-100 meters, adjustably dependent on the actual length of the borehole.

For example, the pattern generation module 30 may utilize the built-in function of bubble chart in Excel spreadsheet to perform the pattern generation and output process as an easier implementation. However, the above Excel spreadsheet is not the only tool for patterning. That is, any patterning tool for illustrating the distribution trend of the data variation is substantially considered to be included. As an illustrative example, the function of bubble chart is invoked. The statistical series in the Y column represents the depth data, and the bubble size for the Y column corresponds with the value of the acoustic reflection amplitude data. Thus, the higher the value of the acoustic reflection amplitude data, the larger the bubble size, and vice versa. After the format of the statistical series is selected, the user can click the bubble width in the value display option. It is suggested that the bubble size is selected, but not limited to, less than 20. Then, the semi-3D image of rock formation along the depth of the borehole similar to a real core sample can be presented.

Figure 2:
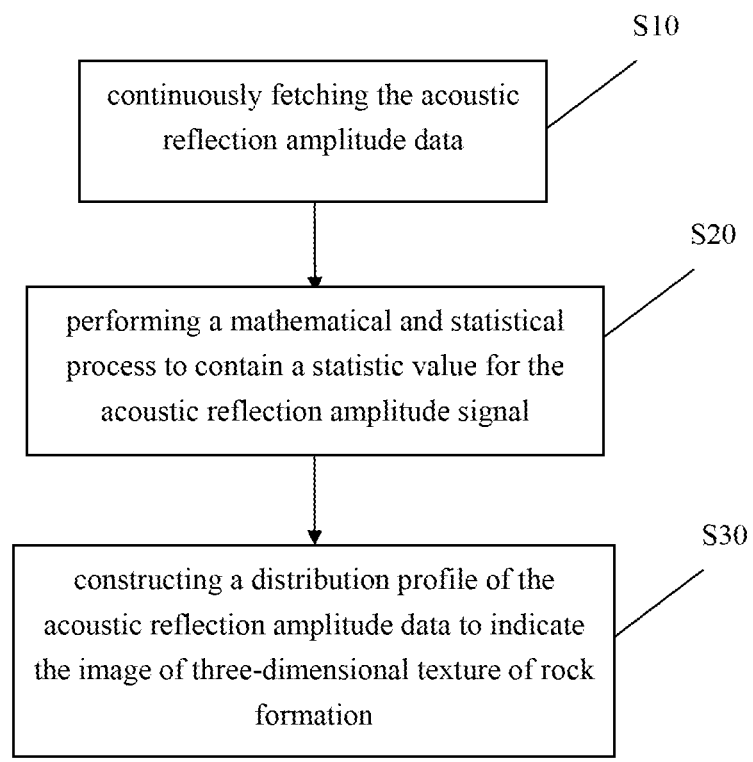
FIG. 2 is a flowchart showing the method for producing a semi-three-dimensional rock formation image along the borehole sidewall according to the second embodiment of the present invention.

Additionally, refer to FIG. 2 illustrating the flowchart showing the method for imaging three-dimensional rock formation along the borehole sidewall according to the second embodiment of the present invention. As shown in FIG. 2, the method of the second embodiment of the present invention generally comprises the sequential steps of S10, S20, and S30 for imaging three-dimensional rock formation along the borehole sidewall.

In the step S10, a plurality of acoustic reflection amplitude data are continuously fetched from the HiRAT, which moves vertically along the borehole and generates acoustic reflection amplitude data with respect to a depth in the borehole as a raw data bank. The acoustic wave is emitted from the HiRAT and reflected at the water-wall interface to generate the reflection amplitude signal.

Then, the step S20 performs a mathematical and statistical process on the acoustic reflection amplitude data within a depth interval to obtain a statistic value for the acoustic reflection amplitude signal for showing the distribution tendency of the acoustic reflection amplitude data.

Finally, in the step S30, a distribution profile of the acoustic reflection amplitude data is constructed to generate the image of semi-three-dimensional structure of rock formation along the borehole sidewall by employing a spreadsheet on the acoustic reflection amplitude data within the depth interval.

It should be noted that part of the aspect of the second embodiment is disclosed in the first embodiment, and will be not described in detail hereinafter.

Obviously, the present invention can fast demonstrate the borehole formation and the rock mass structure, further provides image information to effectively improve the accuracy for determining the relative strength of rock strata, the homogeneity of rock types, the distribution of weak planes, and then to identify significant lithological changes as well as the location of the permeable layers of rock formation, thereby assisting the researcher quickly identify the characteristics of rock formation along a borehole. Particularly, the acoustic reflection amplitude data within each depth interval can be processed to generate a semi-three-dimensional image of rock formation, which has similar arrangement to the rock core with respect to the depth.

One primary application of the present invention can be used in geotechnical engineering practices to improve the interpretation of acoustic reflection amplitude data recorded by the HiRAT and to generate a semi-3D image of rock formation through a simple statistical calculation and patterning process. As a result, the present invention successfully overcome the problems in the prior arts, namely, the difference and variation of rock formation strength is difficult to be identified through the traditional two-dimensional (2D) image with 256 color levels or the pattern of borehole breakout generated with the use of WellCAD. Additionally, the conventional scheme is unable to determine the arrangement or relative positions of rock material in terms of their strength, and therefore provide poor explanation for the overall formation topology.

As mentioned above, one aspect of the present invention is that the acoustic reflection amplitude data is directly fetched and processed to generate a semi-three-dimensional image of rock formation instead of employing the HiRAT connected to the computer to convert the acoustic reflection amplitude data into the 256 levels color image through the post processing program, which is then displayed in the computer. The present invention is novel and has never been proposed before. The present invention is apparently much easier to operate, and the process is simple, reliable and advantageous than the prior arts.

Another aspect of the present invention as distinguished from the conventional 2D image of the borehole wall with 256 color levels or the pattern of borehole breakout generated with the use WellCAD is that a semi-3D rock formation image can be generated through a simple calculation, which provides more readable and understandable pattern or image information to the researcher for better determination and identification. Especially, such semi-3D digital image is more representative of the real structure and composition of geological formation.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for generating a semi-three-dimensional image of rock formation along a sidewall borehole, comprising:

a database being connected to a high resolution acoustic televiewer (HiRAT) for receiving and storing a plurality of acoustic reflection amplitude data as a raw data bank, and the HiRAT being configured to move vertically along the borehole and generate the acoustic reflection amplitude data with respect to the depth in the borehole, an acoustic wave being emitted from the HiRAT and reflected at a water-wall interface to generate the reflection amplitude signal;

a calculation module being electrically linked to the database for automatically fetching the acoustic reflection amplitude data by executing a specific program, and performing a mathematical and statistical process on the acoustic reflection amplitude data within a depth interval to obtain a statistic value for the acoustic reflection amplitude signal and generate a calculation result comprising the statistic values for showing a distribution tendency of the acoustic reflection amplitude data; and a pattern generation module being electrically linked to the calculation module for automatically fetching the calculation result of the calculation module through the specific program, and performing a pattern generation and output process based on the acoustic reflection amplitude data within the depth interval then constructing a distribution profile of the acoustic reflection amplitude data by employing a spreadsheet program to generate a semi-three-dimensional image of rock formation along a borehole.

2. The apparatus as claimed in claim 1, wherein the HiRAT should continuously generate and record the acoustic reflection amplitude data by rotating 360° around the borehole sidewall.

3. The apparatus as claimed in claim 1, wherein the mathematical and statistical process comprises calculating an arithmetic average of the acoustic reflection amplitude data.

4. The apparatus as claimed in claim 1, wherein the central distribution trend comprises a median or a central value of the acoustic reflection amplitude data or a probability distribution for showing the central location or the common trend for data distribution.

5. The apparatus as claimed in claim 1, wherein the depth interval is 0.001-100 meters.

6. A method for imaging three-dimensional texture of rock formation along a borehole sidewall, comprising steps of:

continuously fetching a plurality of acoustic reflection amplitude data from a high resolution acoustic televiewer (HiRAT), the HiRAT moving vertically along the borehole and generating acoustic reflection amplitude data with respect to the depth in the borehole as a raw data bank of a reflection amplitude signal, an acoustic wave being emitted from the HiRAT and reflected at a water-wall interface;

performing a mathematical and statistical process on the acoustic reflection amplitude data within a depth interval to obtain a statistic value for the acoustic reflection amplitude signal for showing a central distribution tendency of the acoustic reflection amplitude data; and constructing a distribution profile of the acoustic reflection amplitude data by employing a spreadsheet program to generate a semi-three-dimensional image of rock formation of along the borehole.

7. The method as claimed in claim 6, wherein the HiRAT continuously generates and records the acoustic reflection amplitude data by rotating 360° around the borehole sidewall.

8. The method as claimed in claim 6, wherein the mathematical and statistical process comprises calculating an arithmetic average of the acoustic reflection amplitude data.

9. The method as claimed in claim 6, wherein the central distribution trend comprises a median or a central value of the acoustic reflection amplitude data or a probability distribution for showing the central location or the common trend for data distribution.

10. The method as claimed in claim 6, wherein the depth interval is 0.001-100 meters.

* * * * *